US008161458B2

(12) United States Patent
Johnson et al.

(10) Patent No.: US 8,161,458 B2
(45) Date of Patent: Apr. 17, 2012

(54) METHOD AND APPARATUS TO INCREASE EFFICIENCY OF AUTOMATIC REGRESSION IN "TWO DIMENSIONS"

(75) Inventors: Darrin P. Johnson, San Jose, CA (US); Damien Farnham, Dublin (IE); Fintan Ryan, Dublin (IE); Sean A. McGrath, Dublin (IE)

(73) Assignee: Oracle America, Inc., Redwood City, CA (US)

( * ) Notice: Subject to any disclaimer, the term of this patent is extended or adjusted under 35 U.S.C. 154(b) by 1237 days.

(21) Appl. No.: 11/862,940

(22) Filed: Sep. 27, 2007

(65) Prior Publication Data

US 2009/0089755 A1 Apr. 2, 2009

(51) Int. Cl.
G06F 9/44 (2006.01)
(52) U.S. Cl. ........................................ 717/124; 717/122
(58) Field of Classification Search .................. None
See application file for complete search history.

(56) References Cited

U.S. PATENT DOCUMENTS

| 5,673,387 | A  | * | 9/1997  | Chen et al. ................ 714/38.1 |
| 5,960,202 | A  | * | 9/1999  | Granston et al. .............. 717/141 |
| 6,182,161 | B1 | * | 1/2001  | Manbert et al. ................ 710/5 |
| 6,195,796 | B1 | * | 2/2001  | Porter ........................... 717/122 |
| 6,944,848 | B2 | * | 9/2005  | Hartman et al. .............. 717/124 |
| 7,096,421 | B2 | * | 8/2006  | Lou ............................... 715/234 |
| 7,222,333 | B1 | * | 5/2007  | Mor et al. ..................... 717/115 |
| 7,305,654 | B2 | * | 12/2007 | Patel et al. .................... 717/101 |
| 7,496,900 | B2 | * | 2/2009  | Dimpsey et al. .............. 717/128 |
| 7,506,312 | B1 | * | 3/2009  | Girolami-Rose et al. .... 717/124 |
| 7,810,081 | B2 | * | 10/2010 | Dickenson et al. ........... 717/140 |
| 7,840,944 | B2 | * | 11/2010 | Brunswig et al. ............. 717/124 |
| 7,958,400 | B2 | * | 6/2011  | Ur ................................. 717/124 |
| 2003/0158919 | A1 | * | 8/2003 | Fomenko ...................... 709/220 |
| 2004/0154001 | A1 | * | 8/2004 | Haghighat et al. ............ 717/130 |
| 2005/0066307 | A1 | * | 3/2005 | Patel et al. .................... 717/124 |
| 2005/0183067 | A1 | * | 8/2005 | Dimpsey et al. .............. 717/128 |
| 2007/0006041 | A1 | * | 1/2007 | Brunswig et al. ............. 714/38 |
| 2007/0010975 | A1 | * | 1/2007 | Fine et al. ..................... 703/2 |
| 2007/0234300 | A1 | * | 10/2007 | Leake et al. .................. 717/124 |
| 2010/0058294 | A1 | * | 3/2010 | Best et al. ..................... 717/122 |

OTHER PUBLICATIONS

Yanping Chen et al. "Specification-Based Regression Test Management with Risk Analysis: A New Regression Test Selection Approach" University of Ottawa, May 2007, <http://www.site.uottawa.ca/~ychen/Paper_CASCON02.pdf> pp. 1-29.*

(Continued)

Primary Examiner — Thuy Dao
Assistant Examiner — Samuel Hayim
(74) Attorney, Agent, or Firm — Osha • Liang LLP (57) ABSTRACT Techniques for efficiently isolating software regressions are provided. A system test tool determines that a particular regression is present in a particular build of a software system, but not in a baseline build. Using historical data, the tool determines, for each of a plurality of intermediate builds between these two builds, a likelihood that that intermediate build introduced the particular regression. A particular intermediate build can be identified as a build to be tested. Here, the particular intermediate build comprises a plurality of layered putbacks, each of which putbacks comprises one or more code changes in the software system. The tool determines, for each putback, a likelihood that that putback introduced the particular regression. A particular putback in the plurality of putbacks may be selected as a putback to be tested. In some embodiments, the particular putback is the putback that has the greatest likelihood of introducing the particular regression.

14 Claims, 6 Drawing Sheets

OTHER PUBLICATIONS

Hareton Leung et al. "Insights into Regression Testing," IEEE, 1989, <http://ieeexplore.ieee.org/stamp/stamp.jsp?tp=&arnumber=65194> pp. 1-10.*

Gregg Rothermel et al. "On Test Suite Composition and Cost-Effective Regression Testing," ACM, Jul. 2004, <http://delivery.acm.org/10.1145/1030000/1027093/p277-rothermel.pdf> pp. 1-55.*

* cited by examiner

Fig. 4

METHOD AND APPARATUS TO INCREASE EFFICIENCY OF AUTOMATIC REGRESSION IN "TWO DIMENSIONS"

BACKGROUND

In order to verify that software is functioning properly, the software must be adequately tested. Software testing is typically done after a threshold of change is reached to warrant the testing. Software testing may be performed during final integration of code or at intermediate stages in the development process, particularly in the case of more complex software packages.

According to an approach disclosed in a related application (U.S. patent application Ser. No. 11/388,445), "PROBABILISTIC SYSTEM FOR IDENTIFYING SOFTWARE DEVELOPMENT REGRESSIONS" filed on Mar. 24, 2006 and incorporated by reference as if fully set forth herein, a variety of historical data may be accessed. The historical data may include raw data, as well as analysis (e.g., calculations or probabilities) generated based upon the raw data. Examples of historical data include the number of errors generated by a particular portion of code, identities of users or groups of users responsible for generating and/or modifying the portion of code, and the platform or architecture on which a particular portion of code was tested. In some embodiments, the historical data comprises at least one of one or more source code files, one or more source code control logs, one or more integration requests, and one or more failure reports.

The historical data may be obtained over one or more software builds. From this information, it is possible to determine which intermediate builds of a software system are most likely to have caused a regression. With this information, the cause of the regression can be found faster than with a binary chop method.

However, for a large system, over the years, a typical software build at the system test level may comprise many layered code changes contributed in different parts of the software system by many different development groups and many different developers from many different locations. Merely identifying a particular software build at the system level as being likely candidate does not isolate the regression to a relatively narrow set of code changes.

In view of the above, a need exists for a tool that can efficiently identify one or more problem code changes that caused a software regression identified in a software system.

SUMMARY

An approach that can better identify one or more problem code changes that caused a software regression identified in a software system is described herein. According to one embodiment, it is determined that a software regression has occurred in a software system. For example, the software regression may be absent from an earlier build but appears in a later build of the software system. Here, the earlier build may be a baseline build while the later build may be a system integration build.

In order to isolate the software regression to specific code changes in the software system, a two-part process may be used. In the first part of the two-part process, a particular software build at a coarse level, such as system test level, is first identified as being likely to have introduced the regression. In the second part of the two-part process, a specific putback among all layered putbacks submitted in the particular software build is identified as having introduced the regression to the particular build. A putback is one or more code changes in a single submission to a source code control system in which the source code for the software system is maintained.

To identify the particular software build at the coarse level, a plurality of intermediate builds may be first identified between the earlier build and the later build.

Through a probability model generated based on the historical data kept by the source code control system, an aggregate likelihood of introducing the regression may be computed for each of the plurality of intermediate builds. One or more intermediate builds may be successively selected to be tested in the descending order of the aggregate likelihoods, starting from the highest aggregate likelihood, until a specific intermediate build is identified as the one introducing the regression.

In one embodiment, a pre-intermediate build that just precedes a selected intermediate build is also identified. The selected intermediate build and its pre-intermediate build may be tested to see if the software regression exists in the intermediate build but does not exist in the pre-intermediate build. If that is the case, then the selected intermediate build is determined to be the particular intermediate build that caused the software regression.

The identified particular intermediate build can comprise a plurality of layered putbacks. Each such putback may comprise one or more code changes. In some embodiments, through the same probability model that enables computation of likelihood of introducing the regression for each of the plurality of intermediate builds at the coarse level, a likelihood of introducing the regression may be determined for each putback. As a result, a particular putback in the plurality of putbacks may be selected as a putback to be tested. For example, the particular putback may be the putback that has the greatest likelihood of introducing the particular regression.

To test the particular putback, a putback build that includes only code changes up to the particular putback may be built. This putback build may be built by first removing (i.e., peeling off) all putbacks that are submitted later than the particular putback from the identified particular intermediate build and then rebuilding the software system with only the code changes up to the particular putback.

Similar to the first-part process described above, a succession of putbacks may be tested until a specific putback is identified as introducing the software regression.

In some other embodiments, instead of a two-part process such as described above is used, an alternative process may be used to identify a specific putback in a plurality of layered putbacks that introduces the software regression.

In this alternative process, as in the two-part process, it is first determined that a particular regression has occurred in the software system, for example, in a particular build some time after a baseline build. Here, the baseline build is known to not contain the particular regression. Subsequently, a plurality of intermediate builds between the particular build and the baseline build may be identified. Furthermore, a plurality of putbacks in the plurality of intermediate builds is also identified. Here, as described above, each putback in the plurality of putbacks may comprise one or more sets of code change. In particular, at least one intermediate build in the plurality of intermediate builds comprises two or more putbacks.

Through a probability model, as previously described, a likelihood of introducing the regression may be determined for each putback in the plurality of putbacks. Thus, each putback in each intermediate build is assigned a likelihood of introducing the regression. Based upon these likelihoods, a particular putback in the plurality of putbacks may be selected as a putback to be tested. For example, the particular putback may be the putback that has the greatest likelihood of introducing the particular regression.

To test the particular putback, a putback build that includes only code changes up to the particular putback may be built. This putback build may be built by first identifying an intermediate build in which the particular putback is submitted, then removing (i.e., peeling off) all putbacks that are submitted later than the particular putback from the identified particular intermediate build, and subsequently rebuilding the software system with only the code changes up to the particular putback.

In this manner, not only may an intermediate build that introduces a regression be identified, but a putback that introduces the regression may also be identified. As a result, the time to fix the regression is shortened.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

Techniques for efficiently identifying one or more problem code changes that caused a software regression identified in a software system are described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Builds

Figure 1:
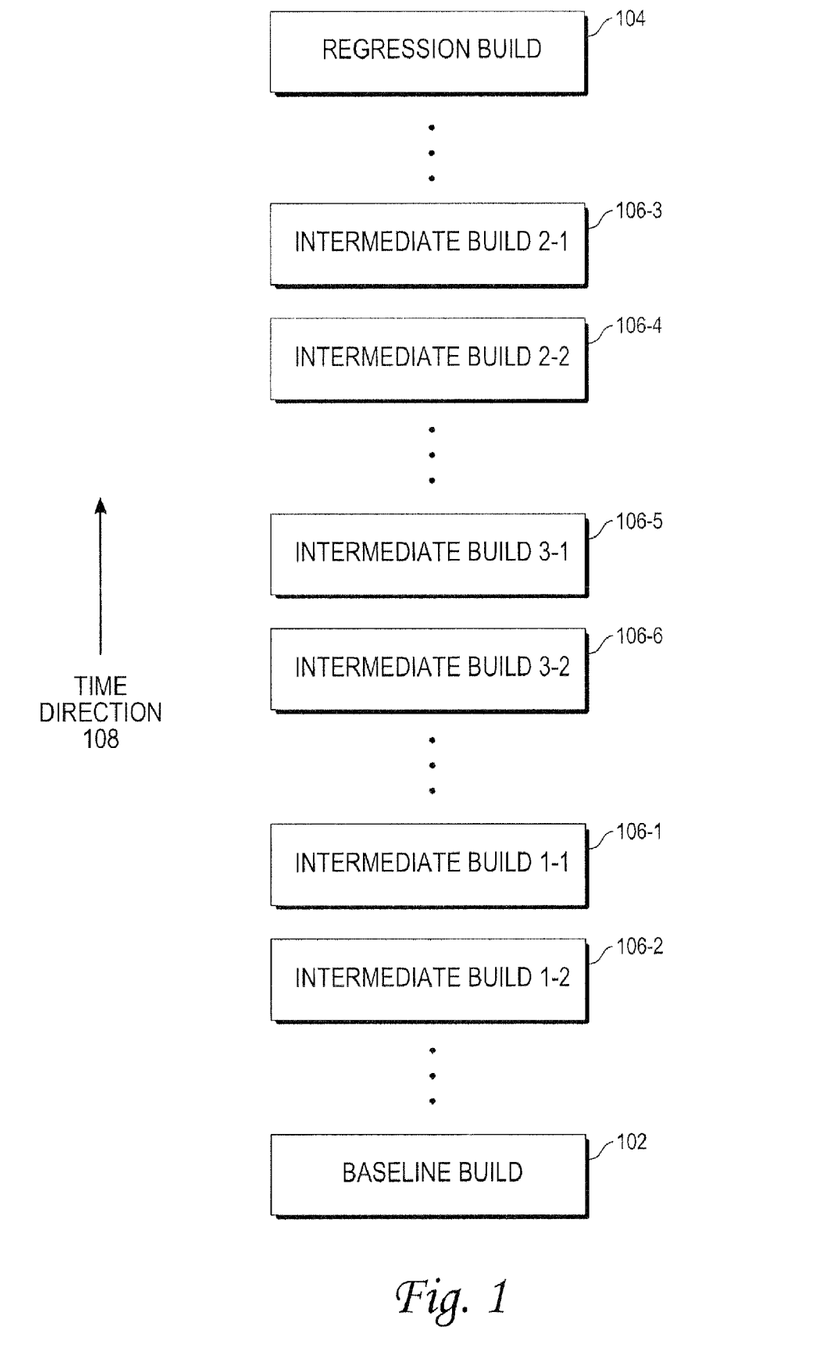
FIG. 1 is a diagram representing a baseline build, a regression build, and a number of intermediate builds there between, in accordance with an embodiment of the present invention.

FIG. 1 is a diagram that represents a baseline build 102 where a software regression is known to be absent from a software system, a regression build 104 in which the software regression in the software system has occurred, and a number of intermediate builds 1-1, 1-2, 2-1, 2-2, 3-1 and 3-2 (106-1 through 6) of the software system between the baseline build (102) and the regression build (104), in an example embodiment of the present invention. In one embodiment, the regression build may be a system integration build that contains all submitted code changes over a period of software development since the baseline build. An intermediate build 106 may be a nightly build that contains all submitted code changes since a previous nightly build or since the baseline build. For a software system that is concurrently developed or supported by a large number of development personnel, code changes may be numerous even between two nightly builds.

A build that is associated with a particular time point along a time direction 108 includes, up to that time point, all source code changes submitted to a source code control system that maintains a source code control history for the software system. Therefore, a software system image produced by such a build is equivalent no matter when such a build is physically made (or reproduced), since the build (e.g., made either today or ten days later) contains an identical set of software baseline source code components and submitted source code changes in the source code control system and produces an identical binary image.

As used herein, the term "software regression" refers to not only a functional failure, but may also refer to a performance problem, an aberration from past normal behaviors when interacting with other entities, etc.

Putbacks

In one embodiment, the baseline build, the regression build, and the intermediate builds are software builds at a coarse level. As used herein, the term "coarse" level refers to a build that captures code changes from more than one code submission. A code submission is called a putback. A developer, for example, may check out some source files from the source code control system, write code changes, create a temporary build of a part or the whole of the software system in a private directory, unit-test the code change, and put back the code changes in the source code control system in a code submission.

Since multiple developers submit code changes between two coarse level builds, the later of the two builds captures new putbacks that occurred after the earlier of the two builds. These new putbacks may be visualized as a stack (or layers), the latest putback being on the top of the stack while the earliest putback being on the bottom of the stack. A later putback conceptually, if not also physically or logically, depends on all putbacks that occurred prior to the later putback.

Figure 2A:
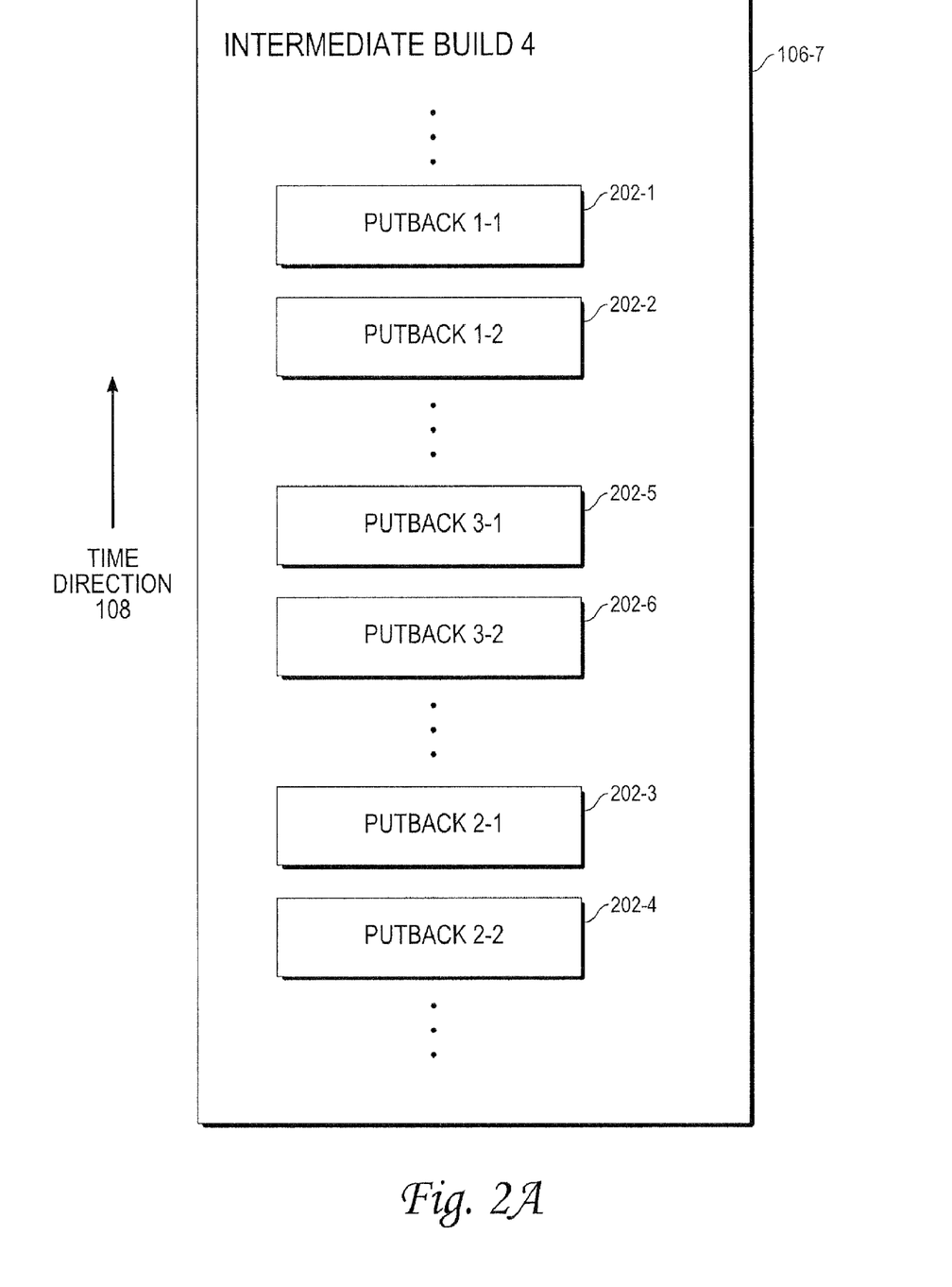
FIGS. 2A and 2B are example intermediate builds with example putbacks, in accordance with an embodiment of the present invention.

For example, as illustrated in FIG. 2A, an intermediate build 4 (106-7) may comprise one or more putbacks (such as putbacks 1-1, 1-2, 2-1, 2-2, 3-1, and 3-2). For the purpose of illustration, dots "..." represent additional putbacks. Any of the putbacks may be a result of a code submission. The putbacks are submitted in the order indicated by the time direction 108. Thus, putback 2-2 is submitted earlier than putback 2-1, which is submitted earlier than putback 1-1, etc., as illustrated in FIG. 2A.

A previous build at the coarse level, which may be another intermediate build or the baseline build, does not include any of the putbacks, while the intermediate build 4 (106-7) includes all the putbacks before a particular time point along the time direction (108) that corresponds to the intermediate build 4 (106-7).

Code Components

For the purpose of the present invention, each putback includes changes to one or more code components. As used herein, the term "code component" refers to a unit of software source code; such a unit of software source code may be a set of instructions in a programming language, a configuration file, a class, a method, a portion of a source code file, one or more source code files, one or more directories or subdirectories in a source code tree, a package of classes, etc. It should be noted that a code component may evolve over its life cycle. Thus, such a code component may contain a varying number of source code lines over the time.

Many code components of the software system may have been changed between the baseline build (102) and the regression build (104). In some embodiments, these code components form a set of candidate code components. Before any particular intermediate build after the baseline build, or any putback between the baseline build (102) and the regression build (104), has been identified as a problem build, any code component in the set of candidate code components may be considered a possible contributing cause for the software regression.

Probabilistic Model

In accordance with one embodiment of the invention, in order to methodically identify putbacks that are likely to be the cause of a regression, historical data is accessed. This historical data may be collected over one or more builds (for example, since the inception of the software system). From the historical data, a model such as a probability model may be generated.

For each code component in the software system, one or more "probabilities of failure" may be ascertained from the historical data. Since a putback contains changes to one or more code components, the likelihood that a putback caused a regression is the sum of the probabilities of failure of the code components that were changed in that putback; for example, if a putback changed code components A and B, and if the probabilities of failure of A and B are x and y, then the likelihood the regression was caused by the putback is X+Y. In some embodiments, this probability may be different for different types of regression; for example, a source file (which may be considered as a code component) may be a likely cause of networking regression but a very unlikely cause of memory management regression. Thus, for such a source file, there may be one or more probabilities of failure, each of which corresponds to a specific type of regression. In some embodiments, such a probability may be ascertained from the number of errors generated by the corresponding code component during one or more tests, as indicated by the historical data. However, it is important to note that some code components may be more error prone than others due to their complexity, or other reasons. Moreover, some code components may be fairly lengthy, while others may be fairly short. As a result, in some embodiment, it may be desirable to identify the number of errors generated per unit length of source code, such as the number of source code lines.

Although the probability of failure in this example is determined based upon the generation of errors by a particular code component, the probability of failure may be calculated using a variety of historical data. For instance, the probability of failure may take into account the user or set of users responsible for generating and/or modifying the set of instructions in the past. Other historical data such as that set forth herein may also be considered.

A variety of algorithms and calculations may be used to generate the probabilistic model from the historical data. Moreover, a weighting value may be assigned to various criteria in the historical data for use in such calculations. For instance, a weighting value or other indicator may indicate a complexity or difficulty of a corresponding code component. In other words, a weighting value or other indicator may be assigned to one or more code components to indicate their complexity or difficulty (or lack thereof). As another example, a weighting value may indicate the recency of the generation or modification of the corresponding code component. Such weighting values or indicators may be stored in the historical data.

Historical Data

The historical data that is collected may include raw data, as well as analysis of the collected data. The historical data may include one or more source code files including source code and/or associated source code changes. In addition, the historical data may include one or more logs such as a source code control log. A source code control log documenting the source code changes may identify the portion(s) of the source code that has been modified (e.g., added, deleted, and/or other modifications), as well as other associated data. The data may also include one or more integration requests. The log or integration requests may include a variety of information associated with source code changes. For instance, it may be desirable to identify a user or set of users responsible for the source code change, a geographical location of the user or set of users (e.g., group or organization), the date and/or time of the source code change, proximity of the change to the deadline, or other information.

A failure (or bug) report that is generated may document errors or other failures. For instance, the failure report 108 may document functional or performance problems by recording error messages, or other failures. Thus, the historical data may include one or more failure reports.

In accordance with one embodiment, a relationship between one or more of the above is identified. For instance, historical data may be used to map types of regressions (e.g., failure reports) to specific code changes using integration requests and/or source code control log files. Such a mapping may then be used to generate a probability model indicating probabilities of failures associated with various portions of code (e.g., files or groups of files).

The data that is collected during test sessions may include one or more of the types of data set forth above. However, it is important to note that the data set forth above is merely illustrative, and therefore other types of data may be collected and/or analyzed.

EXAMPLE IMPLEMENTATION

To facilitate a complete understanding of the present invention, a specific sample implementation of a process will now be described. It should be noted that this sample implementation is provided for illustrative purposes only. It is not meant to be limiting or definitive. Many other implementations are possible and are within the scope of the present invention. In the following discussion, it will be assumed that a system test tool is used to isolate a software regression to a specific intermediate build at the coarse level or to a specific putback at the individual putback level. It will also be assumed that the software regression is introduced in a sequence of builds as shown in FIG. 1 and that each of the intermediate builds 106 (such as 106-1 through 6 of FIG. 1 and those indicated by dots) comprises a number of putbacks similar to the intermediate build 106-7 of FIG. 2A.

Aggregate Likelihood of Failure

For the purpose of illustration, the system test tool first detects a regression in the regression build (104). The system test tool subsequently determines the nature/type of the regression. Using the probabilistic model that is generated based on the historical data, for each build such as intermediate builds 106 of FIG. 1, an aggregate likelihood that the regression (with the nature/type of the regression) is introduced in that build may be calculated. For example, for one such intermediate build, say 106-1 through 6 or 106-7 of FIG. 2A, an aggregate likelihood may be computed using the probabilistic model as follows.

A number of putbacks 202 may have been submitted in an intermediate build such as 106-1 of FIG. 1. As a result, a number of code components have been changed. As used herein, the term "changed" refers to modification, addition, or deletion of source code, source code file, methods, data, macros, classes, etc. The system test tool can use the probability model to calculate an (individual) likelihood of failure with respect to each of the changed code components in the intermediate build. Based on all the individually predicted likelihood of failure for each of the changed code components, the system test tool can calculate an aggregate likelihood of failure for the intermediate build by simple summation of the individual likelihoods.

Since the historical data contains information for each code component in the software system, the probabilistic model may be built to indicate a likelihood factor (or a probability of failure) for each changed code component. For example, using the probability model, the system test tool may calculate a likelihood factor for a changed code component in a putback, say 202-1.

Based on likelihood factors for all changed code components in a putback, a likelihood factor for the putback may be obtained by summing up all these likelihood factors. Likewise, for other putbacks such as 202-2 through 202-6, the system test tool may compute for each such putback a likelihood factor by summing up likelihood factors for changed code components contained in each such putback. As a result, a likelihood factor may be computed for each putback 202 in an intermediate build such as 106-7 of FIG. 2A.

Based on likelihood factors for all putbacks 202 in an intermediate build, a likelihood factor for the putback may be obtained by summing up all these likelihood factors. As a result, a likelihood factor may be computed for each intermediate build 106 between the baseline build (102) and the regression build (104).

For example, the system test tool may obtain an aggregate likelihood of failure for intermediate build 1-1 (i.e., 106-1) as 0.4.

Likewise, the system test tool may obtain an aggregate likelihood of failure for each of the intermediate builds (106) between the baseline build (102) and the regression build (104). For example, intermediate build 2-1 may have an aggregate likelihood of 0.3.

Select an Intermediate Build

In some embodiments, instead of using a brute-force binary chop selection mechanism, the system test tool selects an intermediate build (106) for testing, taking into consideration all aggregate likelihoods of failure that are associated with the intermediate builds. In a particular embodiment, the system test tool selects a build whose aggregate likelihood of failure is of the highest value among those of all the intermediate builds (106). In various embodiments, each intermediate build may be associated with an aggregate likelihood of failure, either all normalized (i.e., the sum of all aggregate likelihoods of failure for all the intermediate builds is 1), or all non-normalized (i.e., the sum of all aggregate likelihoods of failure for all the intermediate builds may not be 1, but a higher aggregate likelihood of failure still indicates a larger probability of introducing the regression than another lower aggregate likelihood).

For example, if intermediate build 1-1 (106-1) has an aggregate likelihood of failure as 0.4, and if all other intermediate builds 106 have aggregate likelihoods of failure as less than 0.4, then the system test tool selects intermediate build 1-1 as the first build to test for the purpose of determining whether the selected build introduces the software regression. As used herein, the term "the selected build introduces" means that the software regression is first brought into the software system or the source code control system in the selected build.

In one embodiment, a pre-intermediate build that just precedes a selected intermediate build is also identified. For example, when intermediate build 1-1 is identified as the most likely build that introduces the regression, an intermediate build 1-2 that just precedes the selected intermediate build (i.e., intermediate build 1-1) may also be identified. Like the selected intermediate build, the pre-intermediate build may be another intermediate build such as a nightly build that comprises many putbacks.

The selected intermediate build and its pre-intermediate build (106-1 and 106-2 of FIG. 1) may be tested to see if the software regression exists in the selected intermediate build (106-1 of FIG. 1) but does not exist in the pre-intermediate build (106-2 of FIG. 1). If that is the case, then the selected intermediate build is determined to be the particular intermediate build that caused the software regression.

On the other hand, if it is found that both the selected intermediate build and its pre-intermediate build (106-1 and 106-2 of FIG. 1) exhibit the software regression, then the software regression must be in an earlier build than the selected intermediate build (106-1).

Conversely, if it is found that both the selected intermediate build and its pre-intermediate build (106-1 and 106-2 of FIG. 1) exhibit an absence of the software regression, then the software regression must be in a later build than the selected intermediate build (106-1).

Select Next Intermediate Build

For the purpose of explanation, the system test tool determines that the selected intermediate build does not introduce the software regression. To select next intermediate build for the purpose of testing for the origin of the regression, the system test tool may exclude all the intermediate builds up to the selected intermediate build that has just been tested. In a particular embodiment, the system test tool selects a build whose aggregate likelihood of failure is of the highest value among those of all the remaining intermediate builds. For example, if intermediate build 2-1 (106-3) has an aggregate likelihood of failure as 0.35, and if all other remaining intermediate builds 106 have aggregate likelihoods of failure as less than 0.35, then the system test tool selects intermediate build 2-1 as the next build to test for the purpose of determining whether this newly selected build introduces the software regression.

As before, a pre-intermediate build that just precedes the newly selected intermediate build may be identified. An intermediate build 2-2 that just precedes the newly selected intermediate build (i.e., intermediate build 2-1) may also be identified. Like the newly selected intermediate build, this new pre-intermediate build may be another intermediate build such as a nightly build that comprises many putbacks.

The newly selected intermediate build and its pre-intermediate build (106-3 and 106-4 of FIG. 1) may be tested to see if the software regression exists in the newly selected intermediate build (106-3 of FIG. 1) but does not exist in its pre-intermediate build (106-4 of FIG. 1). If that is the case, then the newly selected intermediate build is determined to be the particular intermediate build that caused the software regression.

However, if it is found that both the newly selected intermediate build and its pre-intermediate build (106-3 and 106-4 of FIG. 1) exhibit an absence of the software regression, then the software regression must be in a later build than the newly selected intermediate build (106-3).

Conversely, if it is found that both the newly selected intermediate build and its pre-intermediate build (106-3 and 106-4 of FIG. 1) exhibit the software regression, then the software regression must be in an earlier build than the newly selected intermediate build (106-3).

Isolate to an Intermediate Build

For the purpose of explanation, the system test tool determines that an earlier build than the newly selected intermediate build (106-3) introduces the software regression. To select next intermediate build for the purpose of testing for the origin of the regression, the system test tool may exclude this newly selected intermediate build that has just been tested from being a candidate for the next intermediate build. In a particular embodiment, the system test tool selects a build whose aggregate likelihood of failure is of the highest value among those of all the remaining intermediate builds (which now do not include 106-3 but still includes 106-4, in the present example). For example, if intermediate build 3-1 (106-5) has an aggregate likelihood of failure as 0.30, and if all other remaining intermediate builds 106 have aggregate likelihoods of failure as less than 0.30, then the system test tool selects intermediate build 3-1 as the next build to test for the purpose of determining whether this newly selected build introduces the software regression.

In this manner, the above described process may be repeated until an intermediate build that introduces the regression is identified among all the intermediate builds (106-1 through 6 plus all other intermediate builds denoted by the dots in FIG. 1) between the baseline build and the regression build of FIG. 1.

Select a Putback

In some embodiments, after the regression is isolated to a particular intermediate build, an iterative process similar to what has been described may be used to isolate the regression to a particular putback. The system test tool selects a putback for testing based on aggregate likelihoods of failure that are associated with all putbacks in the particular intermediate build. In a particular embodiment, the system test tool selects a putback whose aggregate likelihood of failure is of the highest value among those of all the putbacks in the particular intermediate build. For the purpose of illustration, the regression has been isolated to an intermediate build 106-7, as shown in FIG. 2A, which comprises a number of putbacks (202-1 through 6). In various embodiments, each putback may be associated with an aggregate likelihood of failure, either all normalized (i.e., the sum of all aggregate likelihoods of failure for all the putbacks is 1), or all non-normalized.

For example, if putback 1-1 (202-1) has an aggregate likelihood of failure as 0.28, and if all other putbacks 202 have aggregate likelihoods of failure as less than 0.28, then the system test tool selects putback 1-1 as the first putback to test for the purpose of determining whether the putback introduces the software regression. As used herein, the phrase "the putback introduces" means that the software regression is first brought into the software system or the source code control system in the putback.

In one embodiment, a previous putback that just precedes a selected putback is also identified. For example, when putback 1-1 is identified as the most likely putback that introduces the regression, a putback 1-2 that just precedes the selected putback (i.e., putback 1-1) may also be identified.

To test the selected putback and its previous back (202-1 and 2), a putback build is made for each of the two putbacks. The putback build for the selected putback (202-1) includes all the code submission up to the submission related to the selected putback (202-1), including the previous putback (202-2). Likewise, the putback build for the previous putback (202-2) includes all the code submission up to the previous putback (202-2), but excluding the selected putback (202-1). As used herein, both a putback and its (putback) build may be referred to by the putback. Thus, a putback build that is associated with the putback 1-1 (i.e., 202-1) may both be referred to as the putback 1-1 (or 202-1), for example, as illustrated in FIG. 2A.

In some embodiments, a putback build is performed by removing (or peeling off) all the putbacks submitted later than a putback that is associated with the putback build. For example, the particular intermediate build (106-7) may comprise a number of putbacks in a stacking order along the time direction (108) that correspond to submission times of the putbacks to the source code control system. All the source code and binary image for the particular intermediate build (106-7) may be located on one or more storage locations. A command such as "sccs delget" may be used to remove all putbacks from the one or more storage locations that are submitted later than a particular putback to which a putback build is associated. A new build may be effectuated after all these later putbacks have been removed from the one or more storage locations, resulting in the putback build.

The selected putback build and its previous putback build (as represented by putbacks 202-1 and 202-2 of FIG. 2A) may be tested to see if the software regression exists in the selected putback build (202-1 of FIG. 2A) but does not exist in the previous putback build (202-2 of FIG. 2A). If that is the case, then the selected putback build is determined to be the particular putback build that caused the software regression.

On the other hand, if it is found that both the selected putback build and its previous putback build (202-1 and 202-2 of FIG. 2A) exhibit an absence of the software regression, then the software regression must be in a later putback than the selected putback (202-1).

Conversely, if it is found that both the selected putback build and its previous build (202-1 and 202-2 of FIG. 2A) exhibit the software regression, then the software regression must be in an earlier putback than the selected putback (202-1).

Select Next Putback

For the purpose of explanation, the system test tool determines that an earlier putback than the selected putback (202-1) introduces the software regression. To select next putback for the purpose of testing for the origin of the regression, the system test tool may exclude the selected putback whose build has just been tested from being a candidate for the next putback. In a particular embodiment, the system test tool selects a putback whose aggregate likelihood of failure is of the highest value among those of all the remaining putbacks (which now do not include 202-1 but still includes 202-2, in the present example). For example, if putback 2-1 (202-3) has an aggregate likelihood of failure as 0.28, and if all other remaining putbacks 106 have aggregate likelihoods of failure as less than 0.28, then the system test tool selects putback 2-1 as the next putback to test for the purpose of determining whether this newly selected putback introduces the software regression.

As before, a previous putback that just precedes the newly selected putback may be identified. A putback 2-2 that just precedes the newly selected putback (i.e., putback 2-1) may also be identified.

To test the selected putback and its previous putback (202-3 and 4), a putback build is made for each of the two putbacks. The putback build for the newly selected putback (202-3) includes all the code submission up to the submission related to the newly selected putback (202-3), including the previous putback (202-4). Likewise, the putback build for its previous putback (202-4) includes all the code submission up to the previous putback (202-4), but excluding the newly selected putback (202-3).

The newly selected putback build and its previous putback build (202-3 and 202-4 of FIG. 2A) may be tested to see if the software regression exists in the newly selected putback build (202-3 of FIG. 2A) but does not exist in its previous putback build (202-4 of FIG. 2A). If that is the case, then the newly selected putback is determined to be the particular putback that caused the software regression.

However, if it is found that both the newly selected putback build and its previous putback build (202-3 and 202-4 of FIG. 2A) exhibit the software regression, then the software regression must be in an earlier putback than the newly selected putback (202-3).

Conversely, if it is found that both the newly selected putback build and its previous putback build (202-3 and 202-4 of FIG. 2A) exhibit an absence of the software regression, then the software regression must be in a later putback than the newly selected putback (202-3).

Isolate to an Particular Putback

For the purpose of explanation, the system test tool determines that a later putback than the newly selected putback (202-3) introduces the software regression. To select next putback for the purpose of testing for the origin of the regression, the system test tool may exclude all the putbacks up to the newly selected putback that has just been tested. In a particular embodiment, the system test tool selects a putback whose aggregate likelihood of failure is of the highest value among those of all the remaining putbacks. For example, if a putback 3-1 (202-5) has an aggregate likelihood of failure as 0.20, and if all other remaining putbacks 202 have aggregate likelihoods of failure as less than 0.20, then the system test tool selects putback 3-1 as the next putback to test for the purpose of determining whether this next putback introduces the software regression.

In this manner, the above described process may be repeated until a putback that introduces the regression is identified among all the putbacks (202-1 through 6 plus all other intermediate builds denoted by the dots in FIG. 2A) in the particular intermediate build to which the regression has been isolated.

Select a Putback from all Intermediate Builds

Figure 2B:
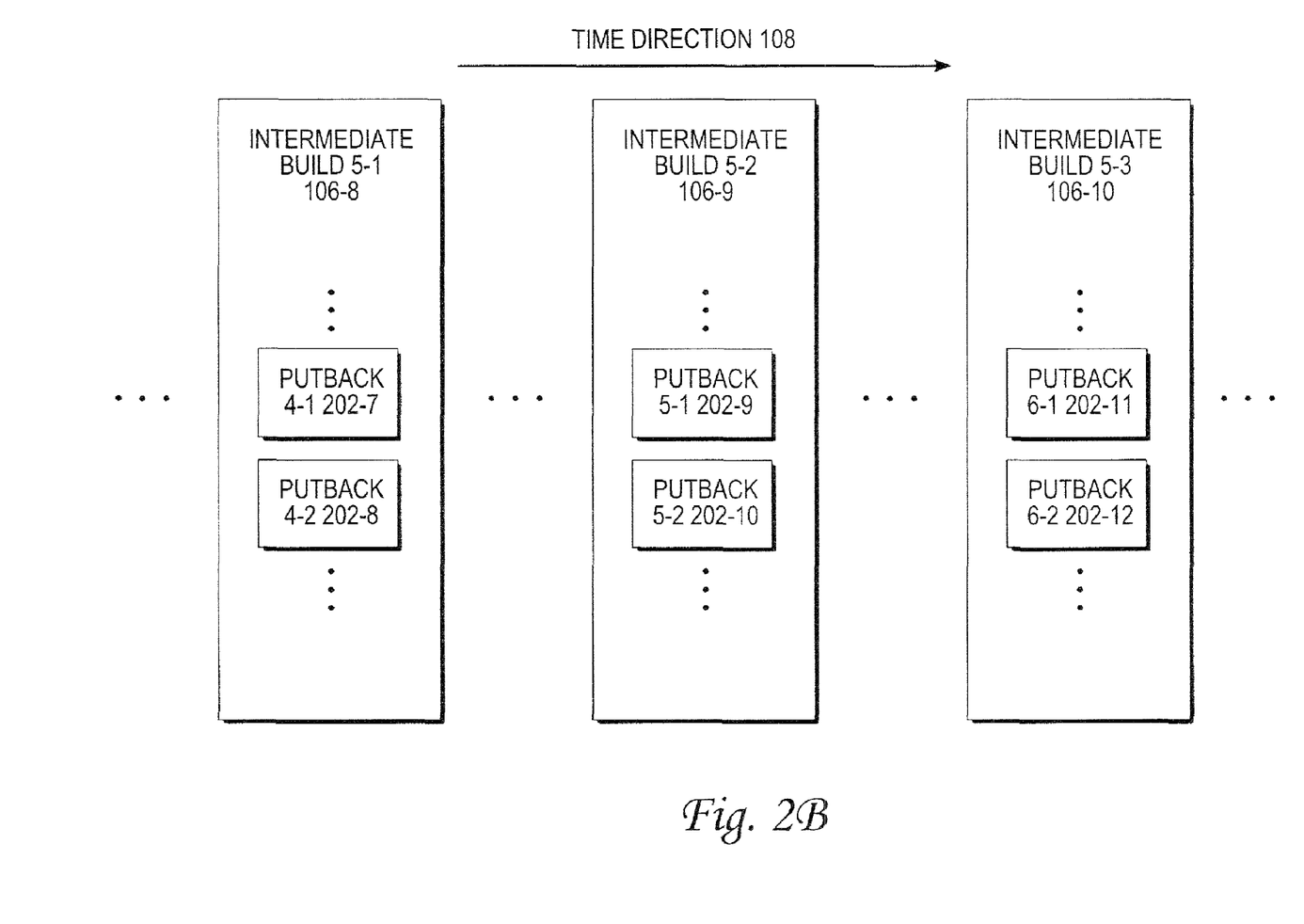

In some embodiments, without first isolating a software regression to a particular intermediate build, the system test tool directly uses an iterative process similar to what has been described to isolate the regression to a particular putback. The system test tool selects a putback for testing based on aggregate likelihoods of failure that are associated with all putbacks in all intermediate builds. In a particular embodiment, the system test tool selects a putback whose aggregate likelihood of failure is of the highest value among those of all the putbacks in all the intermediate builds. For the purpose of illustration, intermediate builds 106-8 through 10, as shown in FIG. 2B, which comprises a number of putbacks (202-7 through 12). In various embodiments, each putback may be associated with an aggregate likelihood of failure, either all normalized (i.e., the sum of all aggregate likelihoods of failure for all the putbacks is 1), or all non-normalized.

For example, if putback 4-1 (202-7) has an aggregate likelihood of failure as 0.20, and if all other putbacks 202 in all builds have aggregate likelihoods of failure as less than 0.20, then the system test tool selects putback 4-1 as the first putback to test for the purpose of determining whether the putback introduces the software regression.

As before, a previous putback that just precedes a selected putback may also be identified. For example, when putback 4-1 is identified as the most likely putback that introduces the regression, a putback 4-2 that just precedes the selected putback (i.e., putback 4-1) may also be identified.

To test the selected putback and its previous back (202-7 and 8), a putback build is made for each of the two putbacks. The putback build for the selected putback (202-7) includes all the code submissions up to the submission related to the selected putback (202-7), including the previous putback (202-8). Likewise, the putback build for the previous putback (202-8) includes all the code submission up to the previous putback (202-8), but excluding the selected putback (202-7).

In some embodiments, a putback build for a putback is performed by removing (or peeling off) all the putbacks submitted later than the putback in an intermediate build that contains the putback. For example, the putback 4-1 is contained in an intermediate build (106-8). The intermediate build (106-8) may comprise a number of putbacks in a stacking order along the time direction (108) that correspond to submission times of the putbacks to the source code control system. All the source code and binary image for the particular intermediate build (106-8) may be located on one or more storage locations. A command such as "sccs delget" may be used to remove all putbacks from the one or more storage locations that are submitted later than a particular putback to which a putback build is associated. A new build may be effectuated after all these later putbacks have been removed from the one or more storage locations, resulting in the putback build.

The selected putback build and its previous putback build (as represented by putbacks 202-7 and 202-8 of FIG. 2B) may be tested to see if the software regression exists in the selected putback build (202-7 of FIG. 2B) but does not exist in the previous putback build (202-8 of FIG. 2B). If that is the case, then the selected putback build is determined to be the particular putback build that caused the software regression.

Conversely, if it is found that both the selected putback build and its previous build (202-7 and 202-8 of FIG. 2B) exhibit the software regression, then the software regression must be in an earlier putback than the selected putback (202-7). In particular, such an earlier putback build may be in a different intermediate build than intermediate build 106-8.

On the other hand, if it is found that both the selected putback build and its previous putback build (202-7 and 202-8 of FIG. 2B) exhibit an absence of the software regression, then the software regression must be in a later putback than the selected putback (202-7). Again, this later putback may be in any intermediate build 106 between the baseline build (102) and the regression build (104).

Select Next Putback from the Intermediate Builds

For the purpose of explanation, the system test tool determines that a later putback than the selected putback build (202-7) introduces the software regression. To select next putback for the purpose of testing for the origin of the regression, the system test tool may exclude all the putbacks of all the intermediate builds up to the selected putback (202-7) in the intermediate build 5-1 (106-8 of FIG. 2B) that has just been tested. In a particular embodiment, the system test tool selects a putback whose aggregate likelihood of failure is of the highest value among those of all the remaining putbacks in all the intermediate builds. For example, if putback 5-1 (202-9) has an aggregate likelihood of failure as 0.15, and if all other remaining putbacks 202 have aggregate likelihoods of failure as less than 0.15, then the system test tool selects putback 5-1 as the next putback to test for the purpose of determining whether this newly selected putback introduces the software regression.

As before, a previous putback that just precedes the newly selected putback may be identified. A putback 5-2 (202-10) that just precedes the newly selected putback (i.e., putback 5-1) may also be identified.

To test the selected putback and its previous putback (202-9 and 10), a putback build is made for each of the two putbacks. Note that the selected putback (202-9) and its previous putback (202-10) are in a different intermediate build 5-2 (i.e., 106-9) than the intermediate build 5-1 (i.e., 106-8), one of whose putback builds has just been tested. The putback build for the newly selected putback (202-9) includes all the code submission up to the submission related to the newly selected putback (202-9), including the previous putback (202-10), in the intermediate build 5-2. Likewise, the putback build for its previous putback (202-10) includes all the code submission up to the previous putback (202-10), but excluding the newly selected putback (202-9).

The newly selected putback build and its previous putback build (202-9 and 202-10 of FIG. 2B) may be tested to see if the software regression exists in the newly selected putback build (202-10 of FIG. 2B) but does not exist in its previous putback build (202-10 of FIG. 2B). If that is the case, then the newly selected putback is determined to be the particular putback that caused the software regression.

However, if it is found that both the newly selected putback build and its previous putback build (202-9 and 202-10 of FIG. 2B) exhibit the software regression, then the software regression must be in an earlier putback than the newly selected putback (202-9).

Conversely, if it is found that both the newly selected putback build and its previous putback build (202-9 and 202-10 of FIG. 2B) exhibit an absence of the software regression, then the software regression must be in a later putback than the newly selected putback (202-9).

Isolate to a Putback in an Intermediate Build

For the purpose of explanation, the system test tool determines that a later putback than the newly selected putback (202-9) introduces the software regression. To select next putback for the purpose of testing for the origin of the regression, the system test tool may exclude all the putbacks up to the newly selected putback that has just been tested. In a particular embodiment, the system test tool selects a putback whose aggregate likelihood of failure is of the highest value among those of all the remaining putbacks. For example, if a putback 6-1 (202-11) has an aggregate likelihood of failure as 0.10, and if all other remaining putbacks 202 have aggregate likelihoods of failure as less than 0.10, then the system test tool selects putback 6-1 as the next putback to test for the purpose of determining whether this next putback introduces the software regression.

In this manner, the above described process may be repeated until a putback that introduces the regression is identified among all the putbacks (202-7 through 12 plus putbacks denoted as dots in 106-8 through 10 and in all other intermediate builds denoted by other dots in FIG. 2B). Once the culprit putback is identified, an intermediate build 106 that contains the culprit putback is also identified as a particular intermediate build that introduces the software regression into the software system.

Example Operation

Figure 3A:
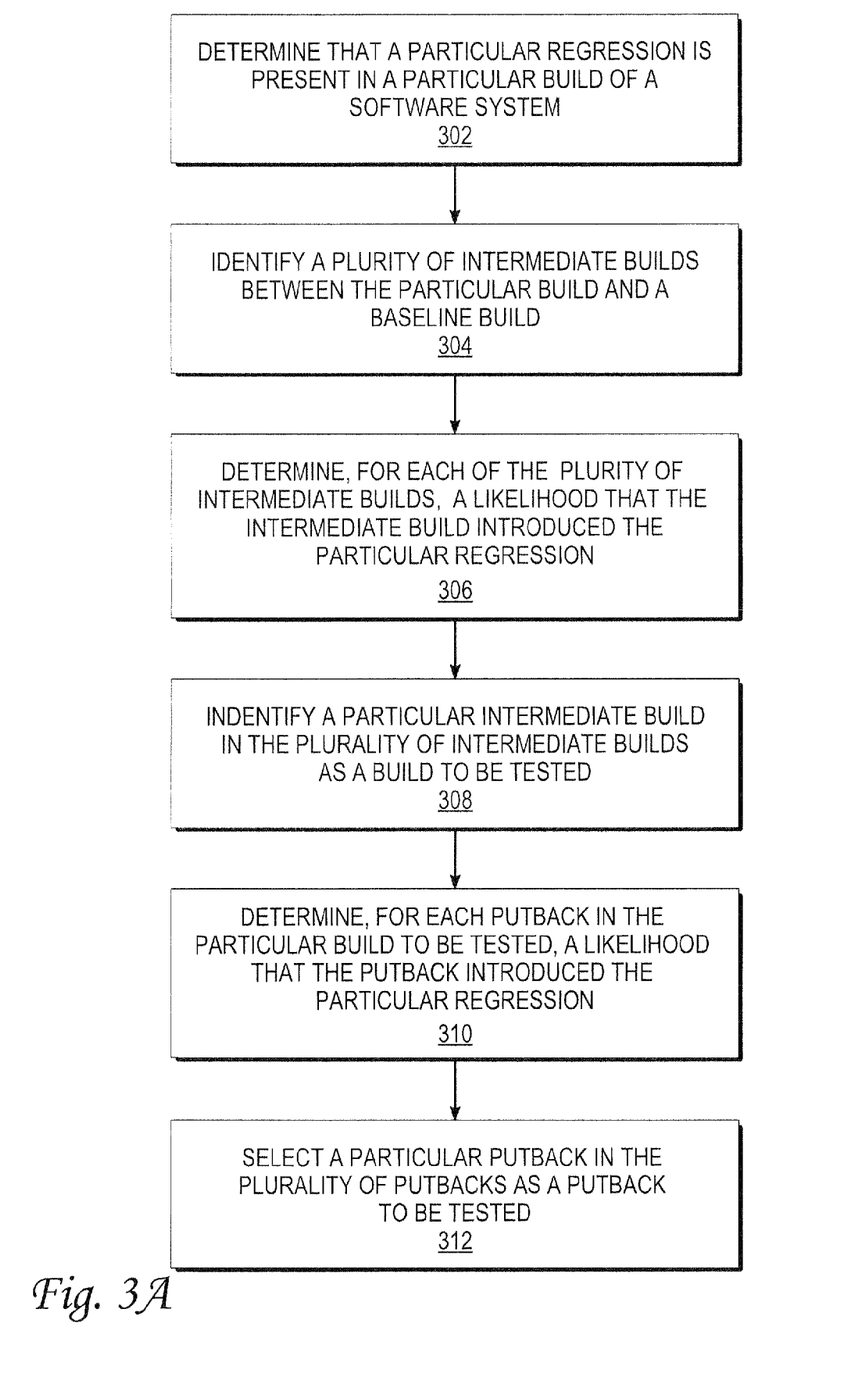
FIG. 3A and FIG. 3B are example process flows, in accordance with an embodiment of the present invention.

FIG. 3A illustrates an example process, in accordance with an embodiment of the present invention. The example process may be implemented by an automated tool such as the system test tool described above in some embodiments. Initially, in block 302, the system test tool determines that a particular regression is present in a particular build of a software system (which may be, for example, the regression build 104 of FIG. 1) of a software system. For example, results recorded in logs of one or more system tests may be compared with the expected results of the system tests. One or more deviations of the test results from the expected results may be considered as a regression.

A regression may be characterized in different ways. For example, a regression may be characterized as a functionality failure while another regression may be characterized as performance degradation. A regression may also be characterized by to which area of code (stored in the source code control system) the regression is related. For example, a regression may be related to a specific part of the software system under test, such as TCP.

In block 304, the system test tool identifies a plurality of intermediate builds between the particular build and a baseline build. Here, the baseline build is known to not contain the particular regression. The intermediate builds may be nightly builds that have been made between the baseline build that is free of the regression and the particular build that has the regression.

Based on the historical data and characterization information (as described above) of the regression, in block 306, the system test tool determines, for each of the plurality of intermediate builds, a likelihood that that intermediate build introduced the particular regression.

In block 308, the system test tool identifies a particular intermediate build in the plurality of intermediate builds as a build to be tested.

In some embodiments, this particular intermediate build is the build that is determined as introducing the regression in the software system, and may be determined in some embodiments using the method previously described that isolates the regression to the particular intermediate build. The sequence of intermediate builds that is to be tested may follow an order established by a probability model that is generated using the historical data, as previously described in connection with FIG. 1.

In some other embodiments, the particular intermediate build is the intermediate build that has the greatest likelihood of introducing the particular regression among the plurality of intermediate builds. This alternative determination of the particular intermediate build may be performed based on the same probability model.

In any event, the particular intermediate build comprises a plurality of layered putbacks, each of which putbacks comprises one or more code changes. In a particular embodiment, the particular intermediate build comprises two or more layered putbacks.

In block 310, the system test tool determines, for each putback, a likelihood that that putback introduced the particular regression (i.e., a likelihood of failure previously mentioned). As in the case of calculating likelihoods of failure for intermediate builds, the system test tool may calculate likelihoods of failure for the putbacks individually using a probability model that is established on the basis of the historical data.

In block 312, the system test tool selects a particular putback in the plurality of putbacks as a putback to be tested. In some embodiments, the particular putback may be the putback that has the greatest likelihood of introducing the particular regression.

In some embodiments, the system test tool peels off, from the particular intermediate build, one or more putbacks that are submitted later than the particular putback. In a particular embodiment, all putbacks that are submitted later than the particular putback are peeled off. Here, the later putbacks are in the plurality of layered putbacks. Based on the particular intermediate build, as peeled off of the later putbacks, the system test tool creates a particular putback build for the particular putback.

In some embodiments, the system test tool peels off, from the particular putback build, the particular putback and creates a second putback build that excludes the particular putback. Using these the particular putback build and its previous putback build (i.e., the second putback build), the system test tool may test whether the particular regression exists in the particular putback build and whether the particular regression exists in the second putback build.

In accordance with an embodiment of the present invention, the historical data accessed by the system test tool (for example, to build the probability model to calculate likelihoods of failures) is associated with a plurality of code components in the software system. Each code component in the plurality of code components can be adapted for performing a set of one or more functions. For example, an internet protocol related code component such as one or more source files may be edited or created (i.e., adapted) by a developer to perform a new function such as supporting IP v6.

The historical data may be obtained over one or more software builds, for example, over several months, years, or decades. Based on the historical data, each code component in the plurality of code components has a likelihood factor associated with each such code component. The likelihood factor indicates a likelihood that that (i.e., the associated) code component caused the particular regression. 16. In a particular embodiment, the likelihood factor indicates recency of generation or modification of an associated code component.

Figure 3B:
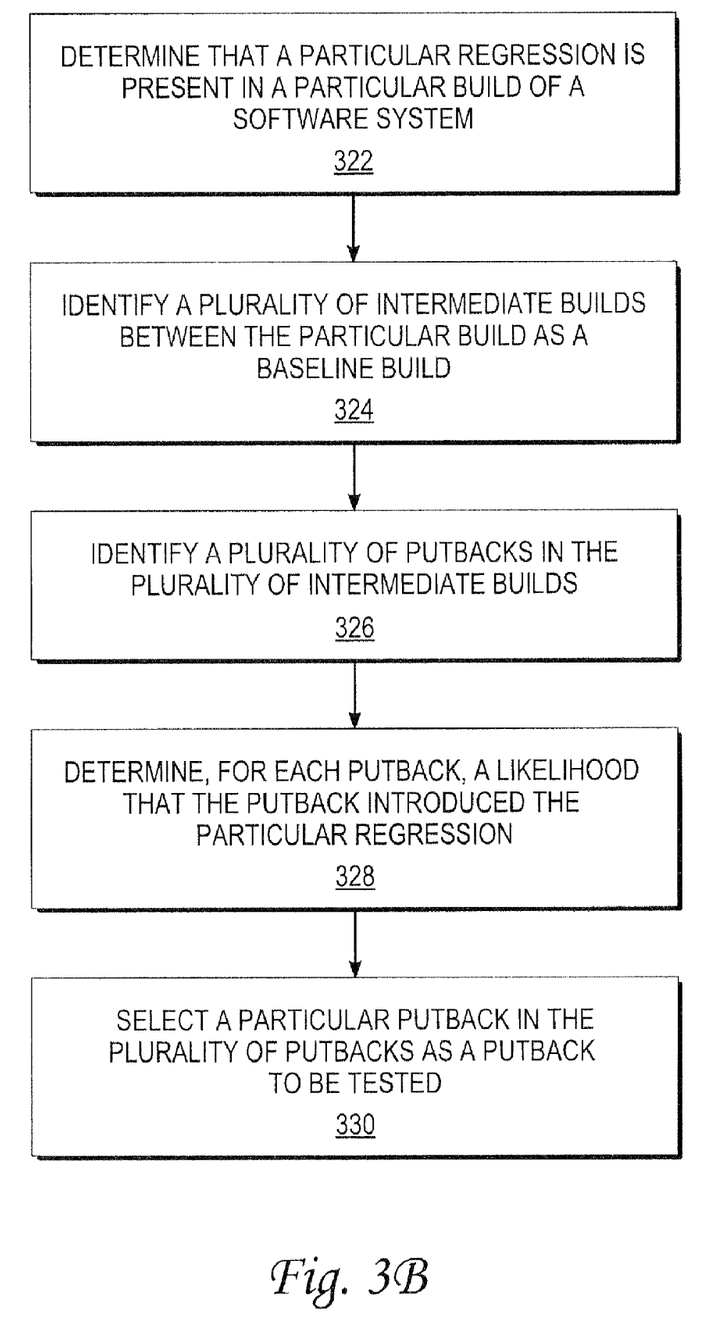

FIG. 3B illustrates another example process flow, in accordance with an embodiment of the present invention. In block 322, the system test tool determines that a particular regression is present in a particular build of a software system (for example, the regression build 104 of FIG. 1) of a software system. In block 324, the system test tool identifies a plurality of intermediate builds between the particular build and a baseline build. As before, the baseline build is known to not contain the particular regression.

In step 326, the system test tool identifies a plurality of putbacks in the plurality of intermediate builds. Here, each putback in the plurality of putbacks comprises one or more sets of code change. At least one intermediate build in the plurality of intermediate builds may comprise two or more putbacks.

In step 328, the system test tool determines, for each putback in the plurality of putbacks, a likelihood that that putback introduced the particular regression (i.e., a likelihood of failure). The system test tool may calculate likelihoods of failure for the putbacks individually using a probability model that is established on the basis of the historical data.

In step 330, the system test tool selects a particular putback in the plurality of putbacks as a putback to be tested. In some embodiments, the particular putback may be the putback that has the greatest likelihood of introducing the particular regression. To test the putback, one or more putback builds may be made. The system test tool may use the putback builds to determine whether the particular putback introduces the regression.

For the purpose of illustration, intermediate builds between the baseline build and the regression build have been described as containing six intermediate builds or more (as indicated by the dots of FIG. 1). It should be noted that this is illustration only. For the purpose of this invention, more or fewer intermediate builds are possible. For example, there may be one intermediate build between the baseline build and the regression build. Thus, all variations of the number of intermediate builds are within the scope of this invention.

Hardware Overview

Figure 4:
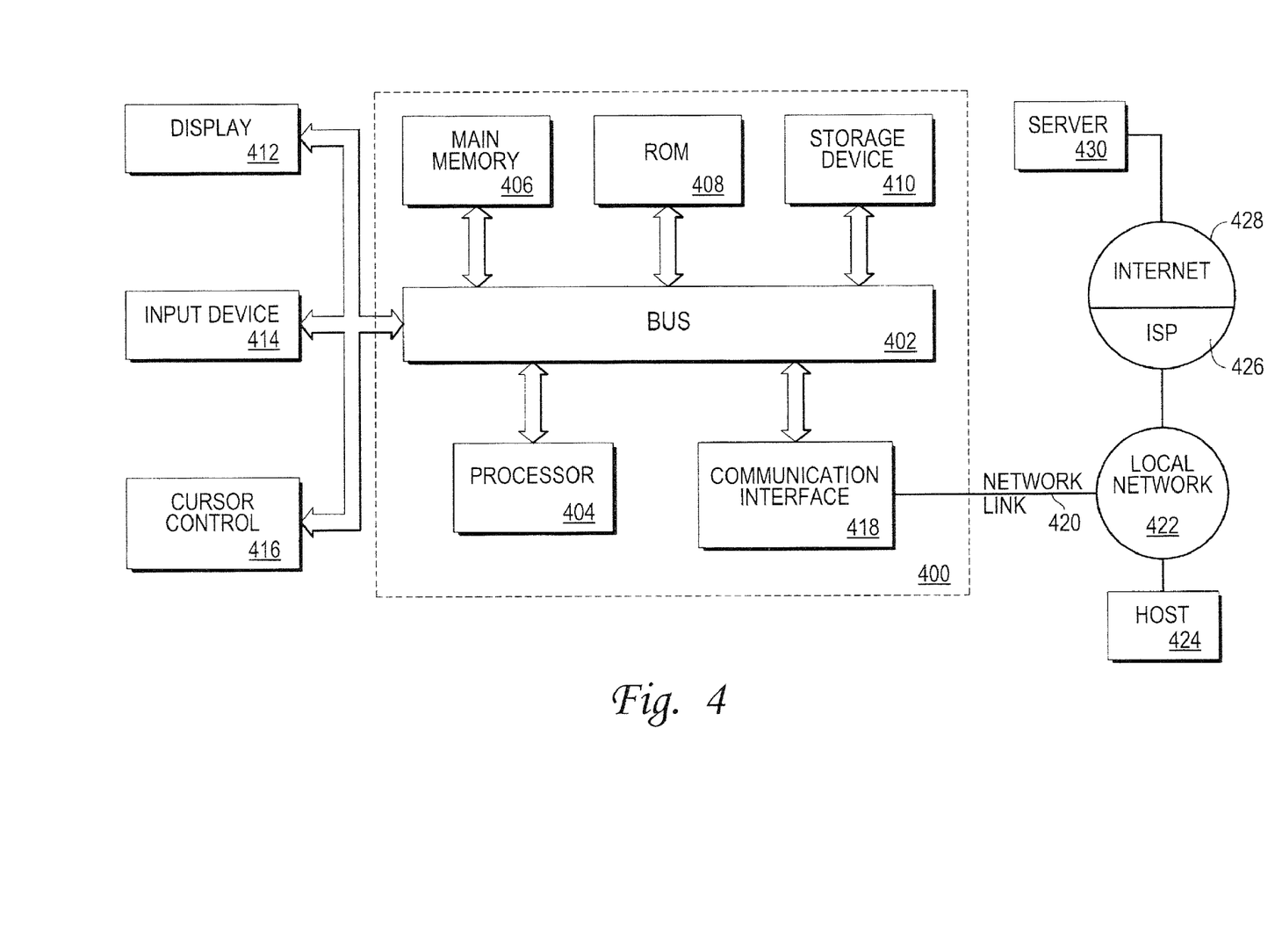
FIG. 4 is a block diagram that illustrates a computer system upon which an embodiment in accordance with the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for the tools and techniques described herein. According to one embodiment of the invention, tools and techniques are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for techniques as described herein.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
    determining, using a hardware processor, that a particular regression is present in a particular build of a software system, wherein the particular regression comprises at least one selected from a group consisting of: a functional failure and a performance problem;
    identifying, using the hardware processor, a plurality of intermediate builds between the particular build and a baseline build, wherein the baseline build is known to not contain the particular regression;
    determining, for each of the plurality of intermediate builds, using the hardware processor, a first value indicating a likelihood that that intermediate build introduced the particular regression, wherein determining each of the first values comprises using a probability model generated from historical data;
    identifying, using the hardware processor, a particular intermediate build in the plurality of intermediate builds as a build to be tested based on the first value associated with the particular intermediate build, wherein the particular intermediate build comprises a plurality of layered putbacks, wherein each putback in the plurality of layered putbacks of the particular intermediate build comprises one or more code changes;
    determining, for each putback in the plurality of layered putbacks, using the hardware processor, a second value indicating a likelihood that that putback introduced the particular regression, wherein determining each of the second values comprises using the probability model; and
    selecting, using the hardware processor, a particular putback in the plurality of putbacks as a putback to be tested based on the second value associated with the particular putback, wherein the particular putback is the putback that has the greatest likelihood of introducing the particular regression.

2. The method of claim 1, further comprising selecting a second putback in the plurality of putbacks as a putback to be tested, wherein the second putback is in the particular intermediate build.

3. The method of claim 1, wherein the particular intermediate build is the intermediate build that has the greatest likelihood of introducing the particular regression.

4. The method of claim 1, wherein the particular intermediate build is the intermediate build that has been tested and determined to be the intermediate build that introduced the particular regression.

5. The method of claim 1, further comprising:
peeling off, from the particular intermediate build, one or more putbacks that are submitted later than the particular putback, wherein the one or more putbacks are in the plurality of layered putbacks; and
creating a particular putback build for the particular putback.

6. The method of claim 4, further comprising:
peeling off, from the particular putback build, the particular putback;
creating a second putback build that excludes the particular putback;
testing whether the particular regression exists in the particular putback build; and
testing whether the particular regression exists in the second putback build.

7. The method as recited in claim 1, wherein the historical data is selected from the group consisting of a) a first historical data that comprises at least one of one or more source code files, one or more source code control logs, one or more integration requests, and one or more failure reports, b) a second historical data that indicates a set of one or more individuals responsible for generating or modifying one or more corresponding code component in the set of candidate code components, c) a third historical data that indicates a geographical region of a set of one or more individuals responsible for generating or modifying one or more corresponding code component in the set of candidate code components, d) a fourth historical data that indicates a complexity or difficulty of one or more corresponding code component in the set of candidate code components, e) a fifth historical data that indicates at least one of a date, time and proximity to deadline of generation or modification of one or more corresponding code component in the set of candidate code components, f) a sixth historical data that indicates a number of errors generated with respect to number of lines of code in one or more corresponding code component in the set of candidate code components, and g) a seventh historical data that is associated with each of the plurality of sets of software instructions indicates at least one of an architecture and platform on which the corresponding set of software instructions was tested.

8. A machine implemented method, comprising:
determining, using a hardware processor, that a particular regression is present in a particular build of a software system, wherein the particular regression comprises at least one selected from a group consisting of: a functional failure and a performance problem;
identifying, using the hardware processor, a plurality of intermediate builds between the particular build and a baseline build, wherein the baseline build is known to not contain the particular regression;
identifying, using the hardware processor, a plurality of layered putbacks in the plurality of intermediate builds, wherein each putback in the plurality of layered putbacks of a intermediate build comprises one or more sets of code change, and wherein at least one intermediate build in the plurality of intermediate builds comprises two or more putbacks of the plurality of layered putbacks;
determining, for each putback in the plurality of putbacks, using the hardware processor, a value indicating a likelihood that that putback introduced the particular regression wherein determining each of the values comprises using a probability model generated from historical data; and
selecting, using the hardware processor, a particular putback in the plurality of putbacks as a putback to be tested based on the value associated with the particular putback, wherein the particular putback is the putback that has the greatest likelihood of introducing the particular regression.

9. The method of claim 8, wherein the particular putback is in a first intermediate build; and further comprising:
selecting a second putback in the plurality of putbacks as a putback to be tested,
wherein the second putback is not in the first intermediate build.

10. The method of claim 9, further comprising:
peeling off, from the first intermediate build, a third putback that is submitted later than the particular putback, wherein the third putback is in the plurality of layered putbacks; and
creating a first putback build for the particular putback.

11. The method of claim 10, further comprising:
peeling off, from the first putback build, the particular putback;
creating a second putback build that excludes the particular putback;
testing whether the particular regression exists in the first putback build; and
testing whether the particular regression exists in the second putback build.

12. The method as recited in claim 8, wherein the historical data is selected from the group consisting of a) a first historical data that comprises at least one of one or more source code files, one or more source code control logs, one or more integration requests, and one or more failure reports, b) a second historical data that indicates a set of one or more individuals responsible for generating or modifying one or more corresponding code component in the set of candidate code components, c) a third historical data that indicates a geographical region of a set of one or more individuals responsible for generating or modifying one or more corresponding code component in the set of candidate code components, d) a fourth historical data that indicates a complexity or difficulty of one or more corresponding code component in the set of candidate code components, e) a fifth historical data that indicates at least one of a date, time and proximity to deadline of generation or modification of one or more corresponding code component in the set of candidate code components, f) a sixth historical data that indicates a number of errors generated with respect to number of lines of code in one or more corresponding code component in the set of candidate code components, and g) a seventh historical data that is associated with each of the plurality of sets of software instructions indicates at least one of an architecture and platform on which the corresponding set of software instructions was tested.

13. A non-transitory machine-readable medium comprising instructions for causing one or more processors to:
- determine that a particular regression is present in a particular build of a software system;
- identify a plurality of intermediate builds between the particular build and a baseline build, wherein the baseline build is known to not contain the particular regression;
- determine, for each of the plurality of intermediate builds, a first value indicating a likelihood that that intermediate build introduced the particular regression, wherein determining each of the first values comprises using a probability model generated from historical data;
- identify a particular intermediate build in the plurality of intermediate builds as a build to be tested based on the first value associated with the particular intermediate build, wherein the particular intermediate build comprises a plurality of layered putbacks, wherein each putback in the plurality of layered putbacks comprises one or more code changes;
- determine, for each putback in the plurality of layered putbacks, a second value indicating a likelihood that that putback introduced the particular regression, wherein determining each of the second values comprises using the probability model; and
- select a particular putback in the plurality of putbacks as a putback to be tested based on the second value associated with the particular putback, wherein the particular putback is the putback that has the greatest likelihood of introducing the particular regression.

14. A non-transitory machine-readable medium comprising instructions for causing one or more processors to:
- determine that a particular regression is present in a particular build of a software system, wherein
  - the particular regression comprises at least one selected from a group consisting of: a
  - functional failure and a performance problem;
- identify a plurality of intermediate builds between the particular build and a baseline build, wherein the baseline build is known to not contain the particular regression;
- identify a plurality of layered putbacks in the plurality of intermediate builds, wherein each putback in the plurality of layered putbacks of an intermediate build comprises one or more sets of code change, and wherein at least one intermediate build in the plurality of intermediate builds comprises two or more putbacks of the plurality of layered putbacks;
- determine, for each putback in the plurality of layered putbacks, a value indicating a likelihood that that putback introduced the particular regression, wherein determining each of the values comprises using a probability model generated from historical data; and
- select a particular putback in the plurality of layered putbacks as a putback to be tested based on the value associated with the particular putback, wherein the particular putback is the putback that has the greatest likelihood of introducing the particular regression.

\* \* \* \* \*